(12) United States Patent
Gregorski

(10) Patent No.: US 8,139,216 B2
(45) Date of Patent: Mar. 20, 2012

(54) OPTICAL PACKAGE ALIGNMENT SYSTEMS AND PROTOCOLS

(75) Inventor: Steven Joseph Gregorski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 343 days.

(21) Appl. No.: 12/622,742

(22) Filed: Nov. 20, 2009

(65) Prior Publication Data

US 2011/0122421 A1    May 26, 2011

(51) Int. Cl.
*G01B 11/00* (2006.01)

(52) U.S. Cl. ........ 356/399; 356/401; 356/614; 356/400; 359/332; 359/824

(58) Field of Classification Search .......... 356/399–401, 356/614; 359/332, 824
See application file for complete search history.

(56) References Cited

U.S. PATENT DOCUMENTS

| | | | | |
|---|---|---|---|---|
| 7,295,742 | B2 | 11/2007 | Sugita et al. | 385/129 |
| 7,751,045 | B2 * | 7/2010 | Gollier et al. | 356/399 |
| 7,756,170 | B2 * | 7/2010 | Almoric et al. | 372/29.014 |
| 7,835,065 | B2 * | 11/2010 | Almoric et al. | 359/332 |
| 7,898,752 | B2 * | 3/2011 | Gregorski et al. | 359/824 |
| 2007/0091411 | A1 | 4/2007 | Mori et al. | |
| 2007/0189689 | A1 | 8/2007 | Yamaguchi et al. | 385/129 |
| 2009/0190131 | A1 | 7/2009 | Gollier et al. | 356/400 |
| 2009/0221188 | A1 | 9/2009 | Gao et al. | |
| 2009/0229740 | A1 | 9/2009 | Yoshino | 156/196 |
| 2009/0231680 | A1 | 9/2009 | Yoshino | 359/328 |

* cited by examiner

*Primary Examiner* — Tarifur Chowdhury
*Assistant Examiner* — Isiaka Akanbi
(74) *Attorney, Agent, or Firm* — Gregory V. Bean

(57) ABSTRACT

Methods of positioning an optical unit in an optical package are provided. According to one method, a partially assembled optical package is provided. The wavelength conversion device within the package comprises a conversion layer having a waveguide portion formed therein. The optical unit is coarse-positioned in the optical package to direct light from the laser diode to the wavelength conversion device in the form of a beam spot on an input face of the wavelength conversion device. The intensity of the frequency-converted optical signal output from the wavelength conversion device is monitored as the position of the optical unit is modified to 1D scan the beam spot along a portion of a crossing axis $Y_1$ that crosses a planar projection of the conversion layer of the wavelength conversion device. Subsequently, the crossing axis $Y_1$ is offset and the intensity monitoring step is repeated as the beam spot is 1D scanned along an offset crossing axis $Y_2$.

20 Claims, 3 Drawing Sheets

OPTICAL PACKAGE ALIGNMENT SYSTEMS AND PROTOCOLS

BACKGROUND

Embodiments of the present disclosure generally relate to the alignment of components within an optical assembly, such as a frequency-converted optical package. More specifically, embodiments of the present disclosure relate to the alignment of optical components within a frequency-converted optical package to facilitate the alignment of an output beam of a laser with a waveguide input of a wavelength conversion device.

BRIEF SUMMARY

The present inventor has recognized a need for extremely accurate positioning of one or more optical components of a frequency-converted optical package, such as a synthetic green laser source. In many synthetic green laser sources, a wavelength conversion device comprising a nonlinear optical crystal, such as a Mg—O doped periodically poled lithium niobate (PPLN) crystal, is used to convert the infrared light emission of a laser into visible green light. The nonlinear optical crystal uses a micrometer-sized waveguide structure to confine and guide light energy therein and the output beam of the laser should be aligned with the waveguide at an input face of the crystal, particularly during assembly of the optical package. The embodiments of the present disclosure also relate optical packages utilizing higher-order harmonic generation.

According to one embodiment of the present disclosure, a method of positioning an optical unit in an optical package is provided. According to the method, a partially assembled optical package is provided. The wavelength conversion device within the package comprises a conversion layer having a waveguide portion formed therein. The optical unit is coarse-positioned in the optical package to direct light from the laser diode to the wavelength conversion device in the form of a beam spot on an input face of the wavelength conversion device. The intensity of the frequency-converted optical signal output from the wavelength conversion device is monitored as the position of the optical unit is modified to 1D scan the beam spot along a portion of a crossing axis $Y_1$ that crosses a planar projection of the conversion layer of the wavelength conversion device. Subsequently, the crossing axis $Y_1$ is offset and the intensity monitoring step is repeated as the beam spot is 1D scanned along an offset crossing axis $Y_2$. This process is repeated until the monitored intensity during the 1D scan meets or exceeds a crossing threshold, at which time an optimum crossing axis $Y^*$ and a corresponding optimum crossing coordinate y along the optimum crossing axis $Y^*$ are identified by referring to respective intensity profiles of the monitored intensities. A full set of optimum coordinates x, y, z are subsequently identified by monitoring the intensity of a frequency-converted optical signal output from the wavelength conversion device as the position of the optical unit is modified to 1D scan the beam spot along a portion of one or more intersecting axes, one of which intersects the optimum crossing axis $Y^*$.

According to another embodiment of the present disclosure, a method of positioning an optical unit in an optical package is provided. According to the method, a partially assembled optical package is provided and an optical unit within the package is coarse-positioned to direct light from the laser diode to the wavelength conversion device in the form of a beam spot on an input face of the wavelength conversion device. The intensity of a frequency-converted optical signal output from the wavelength conversion device is monitored as the position of the optical unit is modified to move the beam spot to a plurality of different positions on the input face of the wavelength conversion device. Optimum coordinates x, y, z in the non-parallel directions of movement of the optical unit are identified by referring to the monitored intensity of the frequency-converted optical signal. Subsequently, a native correction is applied to the optimum coordinates x, y, z by monitoring the intensity of a native frequency optical signal that is output from the wavelength conversion device as incremental adjustments are applied to the optimum coordinates x, y, z.

Additional embodiments are disclosed and claimed.

BRIEF DESCRIPTION OF THE SEVERAL VIEWS OF THE DRAWINGS

The following detailed description of specific embodiments disclosed herein can be best understood when read in conjunction with the following drawings, where like structure is indicated with like reference numerals and in which.

DETAILED DESCRIPTION

Figure 1:
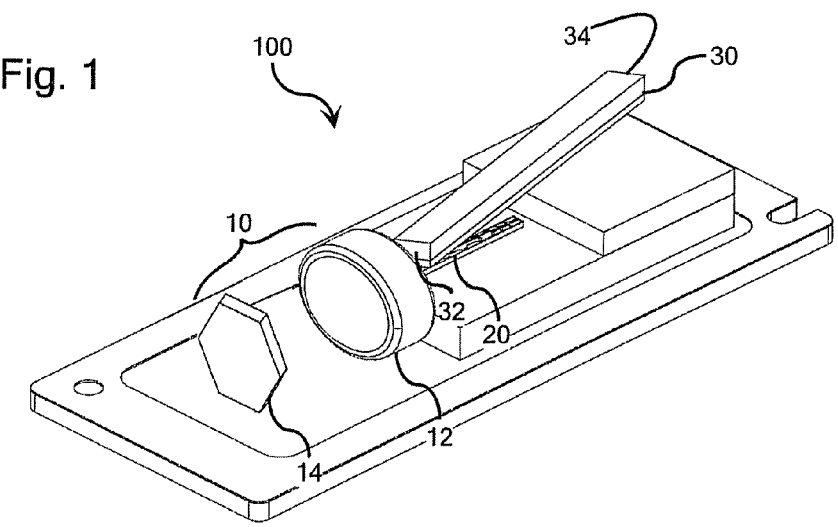
FIG. 1 is an illustration of a folded-path optical package.
Figure 2:
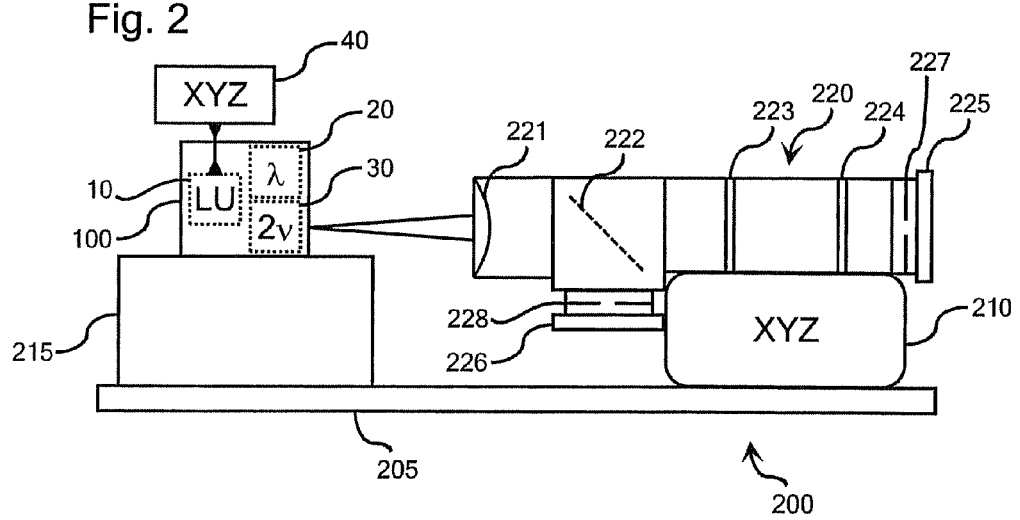
FIG. 2 is a schematic illustration of one optical configuration suitable for facilitating optical unit positioning within a folded-path optical package.
Figure 3:
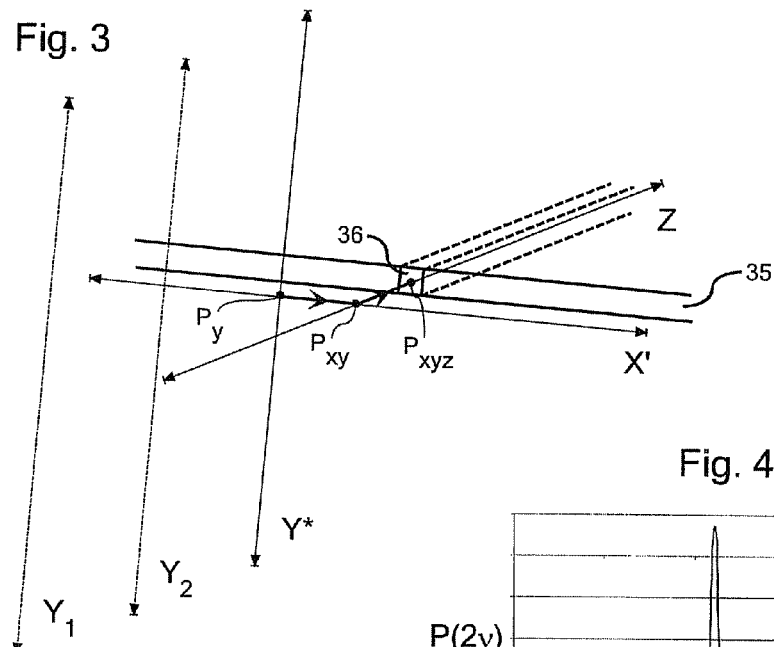
FIG. 3 is a schematic illustration of a mariner in which an optical unit can be positioned within an optical package.

Referring initially to FIGS. 1-3, various methods of positioning an optical unit in an optical package are illustrated in the context of a folded-path optical package 100 coupled to an alignment assembly 200. Generally, the optical package 100 comprises an optical unit 10 which, in the context of a folded path optical package 100, comprises a lens component 12 and a reflective surface 14 that cooperate to define a folded optical path extending from a laser diode 20 to a wavelength conversion device 30. In operation, the reflective surface 14 can be controlled via suitable actuators to control the position of a beam spot on an input face 32 of the wavelength conversion device 30.

The alignment assembly 200 provides an XYZ positioner stage 210 that supports a sensor head 220 and comprises a pedestal 215 upon which the optical package 100 can be mounted. The sensor head 220 comprises a focusing lens 221, a wavelength-selective beam splitter 222, an optical bandpass filter 223, an absorbing filter 224, a frequency-converted optical detector 225, a native wavelength detector 226, and corresponding optical apertures 227, 228, each of which is described in detail below.

The XYZ positioner stage 210 is operative to facilitate initial alignment of the optical package 100 and the sensor head 220. This alignment may be executed according to a variety of conventional or yet-to-be developed procedures. For example, according to one contemplated procedure, the positioner stage 210, which supports the sensor head 220, is only adjusted once during alignment of the sensor head 220 and the pedestal 215, and is then fixed in place over the life of the machine. To do so, the pedestal 215 should be bolted or otherwise secured to the associated optical table 205 and mechanically indicated in for tip and tilt. The objective of this alignment step is to align the pedestal 215 such that if a perfectly aligned optical package were to be mounted on it, the central ray of the emission cone would be angularly aligned with respect to the optical table 205. Typically, only a dial indicator is used to accomplish this alignment, i.e., an actual laser is not needed. In a similar fashion, the sensor head 220 should be bolted to the XYZ stage 210 and mechanically indicated in for tip and tilt.

Next, a finished laser generating a relatively small amount of green light (<5 mW) is provided and the frequency-converted optical detector 225 and the aperture 227 are temporarily removed from the optical path. The XYZ stage 210 is used to coarse adjust the location of the sensor head 220 until an approximately 5 mm diameter green spot is centered at the output of the sensor head. Subsequently, the detector 225 and a 500 μm aperture 227 are temporarily installed in the optical path and the XYZ stage 210 is used to fine adjust the location of the sensor head 220 with the goal of maximizing the received signal at the detector 225, at which time the XYZ stage 210 can be locked in place and the temporary 500 μm aperture is replaced with a permanent 5 mm aperture 227.

In practicing the positioning methodology of the present disclosure, an optical package 100 is provided in a partially assembled state, with the final position of the optical unit of interest to be determined. In the embodiment illustrated in FIGS. 1-3, the optical unit 10 comprises the lens component 12 and the reflective surface 14; however, it is contemplated that the optical unit 10 may comprise more optical components or merely a single optical component. The structure and operation of the reflective surface 14 and the associated lens component 12 are beyond the scope of the present invention and may be gleaned from a variety of conventional publications related to the subject, e.g., U.S. 2009-0190131 A1. In any case, the precise position of the optical unit of interest within the optical package 100 will affect the position of a laser diode beam spot on the input face 32 of the wavelength conversion device 30.

Figure 4:
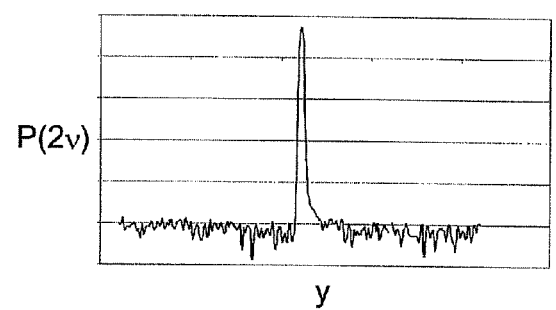
FIG. 4 shows an example of an intensity profile representing monitored intensity P as a function of the y component of a crossing axis $Y_1$.
Figure 5:
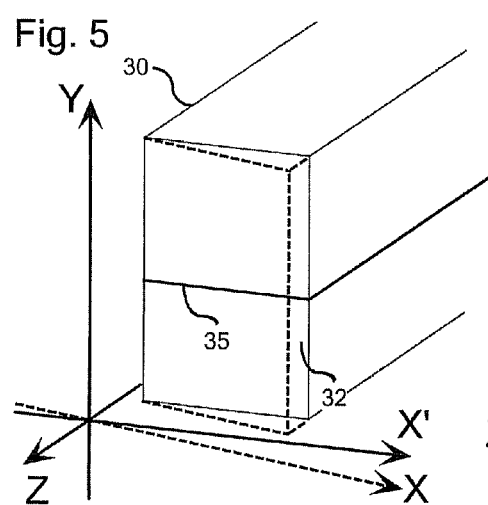
FIGS. 5 and 6 illustrate different conversion device orientations and the crossing and intersecting axes associated therewith.

As is illustrated in FIGS. 4 and 5, the methodology of the present disclosure is particularly well-suited for assembling optical packages that utilize wavelength conversion devices 30 that comprise a conversion layer 35 that extends between the input face 32 of the wavelength conversion device 30 and the output face 34 of the wavelength conversion device 30. The conversion layer 35 is configured to define a waveguide portion 36 therein and, in doing so, may take a variety of forms. For example, as is illustrated schematically in FIGS. 4 and 5, and in more detail in U.S. 2009/0231680 A1, the conversion layer 35 may form an intermediate layer of the wavelength conversion device 30. Alternatively, referring to conversion device configurations similar to those disclosed in U.S. Pat. No. 7,295,742 B2, the conversion layer may form a surface layer of the wavelength conversion device 30. In many cases, the material components of the waveguide portion 36 are indistinct from the material components of a remaining portion of the conversion layer.

To further illustrate the nature of the wavelength conversion device 30, but without limiting the scope of the present disclosure beyond that which is recited in the claims, it is noted that the conversion layer 35 may extend completely across the input face 32 of the wavelength conversion device 30 or at least extends across a majority of the transverse dimension of the input face 32. In many embodiments, the conversion layer 35 extends at least 100 μm across a transverse dimension of the input face 32. In addition, the input and output faces 32, 34 of the wavelength conversion device 30 will often comprise wavelength selective, reflective, or absorptive coatings formed thereon and, as a result, the conversion layer 35 may extend directly or indirectly from the input face 32 of the wavelength conversion device 30 and directly or indirectly to an output face 34 of the wavelength conversion device 30, as is well recognized in the art of frequency-converted laser sources. It is also noted that the conversion layer 35 and the remaining bulk of the wavelength conversion device 30 may take a variety of forms including, but not limited to, ferroelectric single crystal materials selected from lithium niobate or lithium tantalate, or another non-linear optical material, all of which are well documented in the art.

According to the methodology of the present disclosure, the optical unit 10 is initially coarse-positioned in the optical package 100 to direct light from the laser diode 20 to the wavelength conversion device 30 as a beam spot on the input face 32 of the wavelength conversion device 30. This coarse positioning can be affected utilizing any suitable positioning device 40 including, for example, an actuation mechanism that positions the optical unit 10 in the optical package 100 with the aid of a vision system or by reference to fixed coordinates taken relative to a frame of reference defined by the optical package 100. It is contemplated that these types of positioning devices 40 will be readily capable of achieving pick and place precision within approximately ±100 μm from a set of optimum positioning coordinates x, y, z.

With coarse positioning completed, the sensor head 220 can be utilized to monitor the intensity of a frequency-converted optical signal output from the wavelength conversion device 30 as the position of the optical unit 10 is modified to 1D scan the beam spot along a portion of a crossing axis $Y_1$ that crosses a planar projection of the conversion layer 35. This 1D scan, the crossing axis $Y_1$, and the corresponding conversion layer 35 are illustrated schematically in FIG. 3. FIG. 4 shows an example of an intensity profile representing the monitored intensity P as a function of the y component of the crossing axis $Y_1$, including an intensity spike near the optimal y position of the optical unit 10 in the Y direction. Typically, the portion of the crossing axis that is covered by this 1D scan of the beam spot extends a distance that is sufficient to encompass the precision of the coarse-positioning operation, e.g., at least about 200 μm. To minimize the duration of the positioning process, the 1D scan of the crossing axis $Y_1$ is approximately equal to, or only slightly larger than, the full range of the pick and place precision, i.e., no larger than a few hundred microns.

As is illustrated in FIG. 4, the intensity profile representing the monitored intensity as a function of the y component of the crossing axis $Y_1$ will exhibit an intensity spike near the optimal y position of the optical unit 10 in the Y direction, even if the x and y coordinates of the optical unit 10 along the intersecting axes X', Z illustrated in FIG. 3 have not been optimized. Accordingly, the intensity profiles of the frequency-converted optical signals, which are monitored as the beam spot is scanned along the crossing axis $Y_1$ and subsequent crossing axes $Y_i$, represent signal intensity as a function of a positional component of the beam spot along the crossing axes.

In practice, and as is illustrated in FIG. 2, the intensity of the frequency-converted optical signal that is output from the wavelength conversion device 30 can be monitored by utilizing the sensor head 220 to isolate wavelengths of interest in the frequency-converted optical signal. To this end, the sensor head 220 comprises a focusing lens 221, a wavelength-selective beam splitter 222, an optical bandpass filter 223, an absorbing filter 224, a frequency-converted optical detector 225, a native wavelength detector 226, and corresponding optical apertures 227, 228. The focusing lens 221 can be anti-reflective coated at the frequency-converted wavelength, e.g., in the case of a frequency-converted green laser source, it can be AR coated for 530 nm light. The bandpass filter 223 is configured to pass a relatively narrow band of frequency-converted light, e.g., about 10 nm filter width, and will reflectively reject native light for nanowatt resolution of the frequency converted light. This reflective filter is placed between the focusing lens 221 and the absorbing filter 224 to ensure than <<1 mW of native light is transmitted through to the absorbing filter 224, which absorbs native wavelengths. The bandpass filter 223 also functions to reject a majority of ambient light so the system is very insensitive to ambient lighting and does not require special shrouding to function. The detectors 225, 226 can be any of a variety of conventional or yet to be developed designs including, but not limited to, silicon photodiodes and amplifiers with nanowatt resolution of the native and frequency converted light.

According to one embodiment of the present disclosure, the intensity of the frequency-converted optical signal that is output from the wavelength conversion device 30 is monitored while wavelength modulating the laser diode 20 and using an electronic low pass filter to time-average the monitored intensity. According to this embodiment, during the alignment process, the laser diode 20 can be controlled to operate over its full wavelength tuning range. This is accomplished by driving the gain section at a fixed current, and applying a sinusoidal modulation, (e.g., 0 to 110 mA current, 1 KHz frequency) to the wavelength tuning mechanism of the laser 20, e.g., a DBR heater. With this modulation strategy, a priori knowledge of the wavelength characteristics of the DBR laser and SHG crystal is not required, i.e., the technique works for any laser/SHG pairing. In addition, the output of the optical detector 225 can be filtered using a lowpass filter set to a relatively low bandpass, e.g., 100 Hz. Using this filtration technique, the 1 KHz wavelength modulation of the laser diode 20 is not detectable. Instead, a quasi-DC signal is recorded that is proportional to the time-averaged frequency-converted power.

As is further illustrated in FIG. 3, the crossing axis $Y_1$ is offset along the direction X', the direction Z, or both, and the aforementioned intensity monitoring step is repeated as the beam spot is 1D scanned along an offset crossing axis $Y_2$. This operation is repeated for subsequent offset axes $Y_i$ until the monitored intensity during the 1D scan, which is manifested as an intensity spike near the optimal y position, meets or exceeds a crossing threshold. The following table presents example offset coordinates for a set of fifteen offset axes $Y_i$ and the corresponding signal-to-noise ratios for executed 1D scans:

| Y Sweep # | X Offset (um) | Z Offset (um) | S/N |
|---|---|---|---|
| 1 | −50 | −100 | 384 |
| 2 | −50 | −50 | 2246 |
| 3 | −50 | 0 | 3384 |
| 4 | −50 | 50 | 17983 |
| 5 | −50 | 100 | |
| 6 | 0 | −100 | |
| 7 | 0 | −50 | |
| 8 | 0 | 0 | |
| 9 | 0 | 50 | |
| 10 | 0 | 100 | |
| 11 | 50 | −100 | |
| 12 | 50 | −50 | |
| 13 | 50 | 0 | |
| 14 | 50 | 50 | |
| 15 | 50 | 100 | |

In this example, the crossing threshold was set at a signal-to-noise (S/N) ratio of 5000, so the offset process was terminated following the fourth scan and the fourth offset axis was identified as the optimum crossing axis. As is illustrated in the table above, the crossing axis Y1 is typically offset by increments that are less than the precision of the coarse-positioning operation.

More generally, referring again to FIG. 3, an optimum crossing axis Y* and a corresponding optimum crossing coordinate y along the optimum crossing axis Y* are identified by referring to the respective intensity profiles of the monitored intensities for each 1D scan. When a signal-to-noise ratio is used as a primary crossing threshold, the optimum crossing axis Y* and its corresponding optimum crossing coordinate y can be tagged by identifying the profile at which the S/N ratio for a particular 1D scan exceeds the threshold. In addition, to account for instances where the S/N ratio does not reach a large enough magnitude, a secondary crossing threshold can be established to limit the number of repeated scans, in which case the secondary crossing threshold will comprise a predetermined quantity n of 1D scans in the conversion layer crossing direction.

For example, referring to the table above, if none of the S/N ratios exceed the predetermined S/N threshold, then the secondary crossing threshold, which would comprise n=15 1D scans, would be exceeded. In such an instance, the optimum crossing axis Y*, and the corresponding optimum crossing coordinate y would be selected from the n=15 crossing axes by identifying the crossing axis having an intensity profile with the largest signal-to-noise ratio, even if that ratio does not exceed the aforementioned S/N crossing threshold.

A complete set of optimum coordinates x, y, z can be constructed by subsequently monitoring the intensity of the frequency-converted optical signal as the position of the optical unit 10 is modified to 1D scan the beam spot along one or more intersecting axes X', Z. Generally, these intersecting axes can be selected to be approximately orthogonal to the optimum crossing axis Y*, but the intersecting axes X', Z need not be orthogonal axes. In practice it may be preferable to select any of a variety of axes for use as the intersecting axes X', Z, with the exception that one of the intersecting axes X', Z should at least intersect the optimum crossing axis Y.

Wavelength conversion devices are often constructed as SHG crystals with input/output facets that are cut at an angle with respect to the longitudinal axis of the crystal. Accordingly, as is illustrated in FIGS. 3 and 5, it is often preferable to select a primary intersecting axis X' such that it is approximately parallel to the input face 32 of the wavelength conversion device 30, as opposed to being orthogonal to the longitudinal axis of the wavelength conversion device 30.

Figure 6:
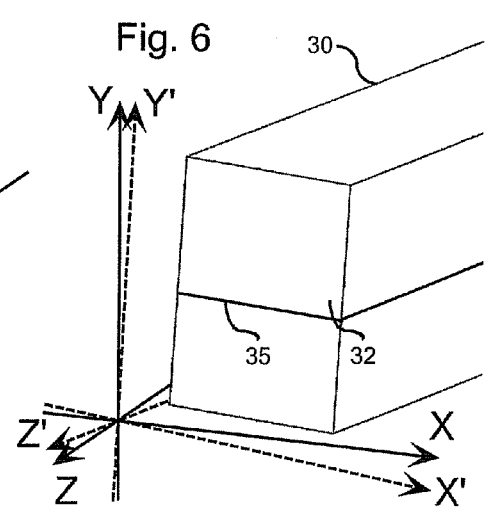

In addition, as is illustrated in FIG. 6, it is often difficult to mount a laser diode and wavelength conversion device 30 in a perfectly aligned state along an identical optical axis. If for example, the laser diode is orthogonally aligned in an XYZ reference frame, the wavelength conversion device 30 may be misaligned along a different reference frame XY'Z'. In which case, it may be preferable to select secondary intersecting axes Y', Z' that are approximately parallel to the input face 32 of the wavelength conversion device 30 and the longitudinal axis of the waveguide portion 36, respectively.

Referring again to FIG. 3, the aforementioned 1D scan of the beam spot along the intersecting axes X', Z, may also be executed along an additional intersecting axis that is approximately parallel to the optimum crossing axis Y*. In each case, the 1D scans in the X', Y, and Z directions can be repeated until a sufficient frequency-converted optical signal strength is reached. Typically, every scan will be long enough to accommodate for the pick and place precision of the coarse positioning operation, i.e., in the case of a ±100 μm pick and place precision the 1D scans in the X', Y, and Z directions would be at least 200 μM in length along each direction. At the completion of each 1D sweep, the axis in motion is returned to the point of peak response for that particular sweep. The sweep sequence can be repeated until a predetermined peak signal strength is reached or a predetermined timeout is reached. It is contemplated that the optical unit 10 will be within a few microns of its optimal aligned position at the completion of the 1D scans in the X', Y, and Z directions.

With the optical unit 10 within a few microns of its optimal aligned position along all three directions X', Y, Z, a final alignment routine can be executed in the native wavelength regime. Specifically, a native wavelength correction can be applied to the optimum coordinates x, y, z by driving the laser diode 20 at low power, at a wavelength that is outside of the conversion bandwidth of the wavelength conversion device 30, or both. In this manner, the optical output from the wavelength conversion device 30 will be almost entirely at the native wavelength of the laser diode 20, which is better-suited for final alignment because it typically provides better signal-to-noise ratios in the detected signal than the wavelength-converted signal. Indeed, as the present inventor has recognized, wavelength-converted signals tend to have a relatively high degree of intensity variation that can be attributed to wavelength drift in the laser diode 20.

The intensity of the native frequency optical signal originating from the laser diode 20 and output from the wavelength conversion device 30 can be monitored by utilizing the wavelength-selective beam splitter 222 and the native wavelength detector 226. In this regime, incremental adjustments are applied to the optimum coordinates x, y, z and the optimum coordinates x, y, z are corrected based on the monitored intensity of the native frequency optical signal. The incremental adjustments that are applied to the optimum coordinates x, y, z are on the order of approximately 1 μm or less and may be executed according to a variety of conventional or yet to be developed optical positioning procedures. The optical unit 10 can be fixed at the corrected optimum coordinates when little or no meaningful adjustment can be made to the detected native signal.

Figure 7:
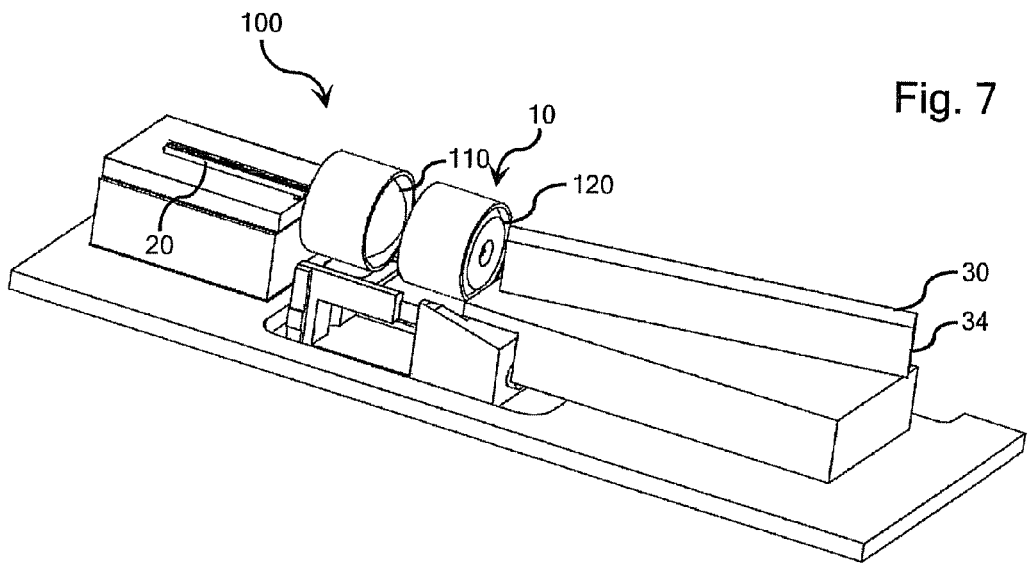
FIG. 7 is an illustration of a uni-directional path optical package.
Figure 8:
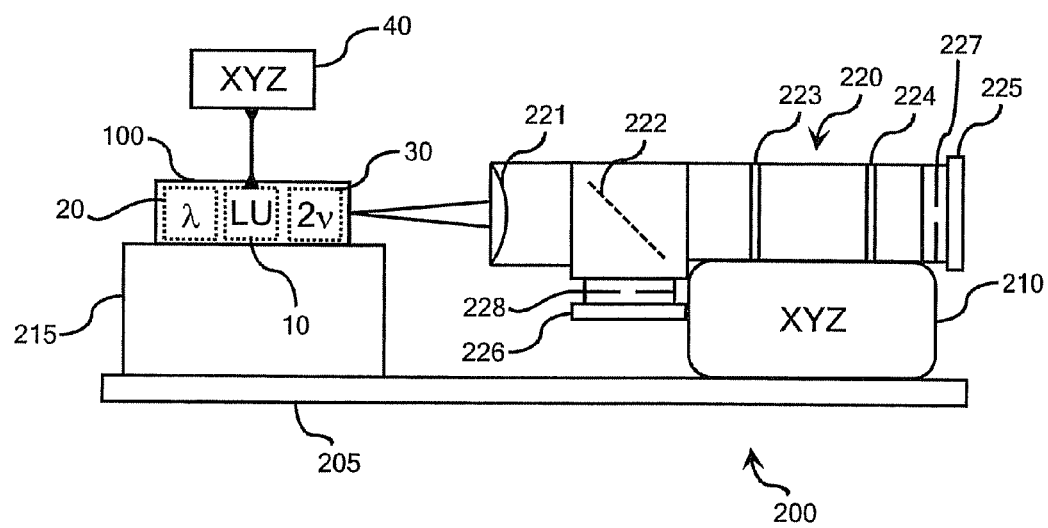
FIG. 8 is a schematic illustration of one optical configuration that is suitable for facilitating optical unit positioning within an optical package comprising a uni-directional optical path.

The concepts of the present disclosure are not limited to the specific optical unit 10 illustrated in FIGS. 1 and 2 or to any optical unit in particular. For example, referring to FIGS. 7 and 8, it is contemplated that the concepts of the present disclosure are applicable to optical packages 100 where the optical unit comprises one or more lens components 110, 120 that are positioned along a uni-directional optical path extending from the laser diode 20 to the wavelength conversion device 30. In any case, whatever optical components are provided in the optical unit 10, the positioning device 40 will be coupled to the optical unit 10 to facilitate the scanning operations described herein. Typically, in the context of a uni-directional configuration similar to that illustrated in FIGS. 7 and 8, the optical unit 10 will merely include one of the lens components 110, 120. The optical package 100 will typically also comprise an adaptive optics assembly that is configured to alter the optical path extending from the laser diode to the wavelength conversion device by changing the position of an optical component in the optical path.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "approximately" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue. In addition, it is noted that reference herein to a parameter being "on the order of" a specific value is intended to mean that the value will fall within the range delimited by the value without departing from the order of that value. For example, a value that is "on the order of" 1 μm will be between 1 μm and less than 10 μm.

It is noted that recitations herein of a component of the present disclosure being "configured" in a particular way, to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

Having described the embodiments of the present disclosure in detail, it will be apparent that modifications and variations are possible without departing from the scope of the invention defined in the appended claims.

What is claimed:

1. A method of positioning an optical unit in an optical package comprising a laser diode, a wavelength conversion device, and an optical unit comprising one or more optical components configured to direct light from the laser diode to the wavelength conversion device, the method comprising:

providing a partially assembled optical package comprising the laser diode and the wavelength conversion device, wherein the wavelength conversion device comprises
 a conversion layer extending between an input face of the wavelength conversion device and an output face of the wavelength conversion device, and
 a waveguide portion formed in the conversion layer;

coarse-positioning the optical unit in the optical package to direct light from the laser diode to the wavelength conversion device in the form of a beam spot on an input face of the wavelength conversion device;

monitoring intensity of a frequency-converted optical signal output from the wavelength conversion device as the position of the optical unit is modified to 1D scan the beam spot along a portion of a crossing axis $Y_1$ that crosses a planar projection of the conversion layer of the wavelength conversion device;

offsetting the crossing axis $Y_1$ and repeating the intensity monitoring step as the beam spot is 1D scanned along an offset crossing axis $Y_2$;

repeating the crossing axis offset until the monitored intensity during the 1D scan meets or exceeds a crossing threshold;

identifying an optimum crossing axis Y* and a corresponding optimum crossing coordinate y along the optimum crossing axis Y* by referring to respective intensity profiles of the monitored intensities; and identifying a first set of optimum coordinates x, y, z by monitoring intensity of a frequency-converted optical signal output from the wavelength conversion device as the position of the optical unit is modified to 1D scan the beam spot along a portion of one or more intersecting axes, one of which intersects the optimum crossing axis Y*.

2. A method as claimed in claim 1 wherein the method further comprises:

applying a native correction to the optimum coordinates x, y, z by monitoring intensity of a native frequency optical signal output from the wavelength conversion device as incremental adjustments are applied to the optimum coordinates x, y, z;

correcting the optimum coordinates x, y, z based on the monitored intensity of the native frequency optical signal output from the wavelength conversion device; and fixing the optical unit at the corrected optimum coordinates.

3. A method as claimed in claim 1 wherein the conversion layer extends for at least a majority of a transverse dimension of the input face of the wavelength conversion device and forms either a surface layer or an intermediate layer of the wavelength conversion device.

4. A method as claimed in claim 1 wherein the conversion layer extends for at least 100 μm across a transverse dimension of the input face of the wavelength conversion device.

5. A method as claimed in claim 1 wherein the optical unit is coarse-positioned in the optical package with the aid of a vision system or by reference to fixed coordinates taken relative to a frame of reference defined by the optical package.

6. A method as claimed in claim 1 wherein:
the coarse positioning operation is characterized by a pick-and-place precision; and
the portion of the intersecting axis covered by the 1D scan of the beam spot extends a distance that is sufficient to encompass the pick and place precision of the coarse-positioning operation.

7. A method as claimed in claim 1 wherein the intensity of the frequency-converted optical signal output from the wavelength conversion device is monitored while wavelength modulating the laser diode and using an electronic low pass filter to time-average the monitored intensity.

8. A method as claimed in claim 1 wherein the intensity profiles of the frequency-converted optical signals, which are monitored as the beam spot is scanned along the crossing axes, represent signal intensity as a function of a positional component of the beam spot along the crossing axes.

9. A method as claimed in claim 1 wherein:
the coarse positioning operation is characterized by a pick-and-place precision; and
the portion of the crossing axis covered by the 1D scan of the beam spot extends a distance that is sufficient to encompass the precision of the coarse-positioning operation.

10. A method as claimed in claim 9 wherein the crossing axis $Y_1$ is offset by increments that are less than the precision of the coarse-positioning operation.

11. A method as claimed in claim 9 wherein the crossing axis $Y_1$ is offset in a direction X' parallel to the input face of the wavelength conversion device, a direction Z parallel to a longitudinal axis of the waveguide portion, or both.

12. A method as claimed in claim 1 wherein:
the optimum coordinates x, y, z are identified by monitoring intensity as the position of the optical unit is modified to 1D scan the beam spot along a plurality of additional axes, at least two of which are not parallel to the optimum crossing axis Y*.

13. A method as claimed in claim 1 wherein:
the optimum coordinates x, y, z are identified by monitoring intensity as the position of the optical unit is modified to 1D scan the beam spot along a primary intersecting axis that intersects the optimum crossing axis Y* and along a secondary intersecting axis that intersects the primary intersecting axis.

14. A method as claimed in claim 13 wherein:
the primary intersecting axis is approximately parallel to the input face of the wavelength conversion device or approximately parallel to a longitudinal axis of the waveguide portion; and
the secondary intersecting axis is approximately parallel to the optimum crossing axis Y*, approximately parallel to the input face of the wavelength conversion device, or approximately parallel to a longitudinal axis of the waveguide portion.

15. A method as claimed in claim 1 wherein:
the optimum coordinates x, y, z are identified by monitoring intensity as the position of the optical unit is modified to 1D scan the beam spot along a primary intersecting axis that intersects the optimum crossing axis Y*, along a secondary intersecting axis that intersects the primary intersecting axis, and along a tertiary intersecting axis that is approximately parallel to the optimum crossing axis Y*.

16. A method as claimed in claim 1 wherein:
the crossing threshold comprises a signal-to-noise ratio associated with the monitored intensity;
the optimum crossing axis Y* corresponds to the intensity profile with a signal-to-noise ratio exceeding the crossing threshold signal-to-noise ratio; and
the corresponding optimum crossing coordinate y along the optimum crossing axis Y* corresponds to a maximum of the intensity profile for the optimum crossing axis Y*.

17. A method as claimed in claim 1 wherein:
the crossing threshold comprises a quantity n of 1D scans in the conversion layer crossing direction;
the optimum crossing axis Y* is selected from n crossing axes and corresponds to a crossing axis having an intensity profile with the largest signal-to-noise ratio; and
the corresponding optimum crossing coordinate y along the optimum crossing axis Y* corresponds to a maximum of the intensity profile for the optimum crossing axis Y*.

18. A method as claimed in claim 1 wherein the optical unit comprises:
at least one lens component positioned along a uni-directional optical path extending from the laser diode to the wavelength conversion device; or
at least one lens component and a reflective surface defining a folded optical path extending from the laser diode to the wavelength conversion device.

19. A method of positioning an optical unit in an optical package comprising a laser diode, a wavelength conversion device, and an optical unit comprising one or more optical components configured to direct light from the laser diode to the wavelength conversion device, the method comprising:
    providing a partially assembled optical package comprising the laser diode and the wavelength conversion device, wherein the wavelength conversion device comprises a waveguide portion;
    coarse-positioning the optical unit in the optical package to direct light from the laser diode to the wavelength conversion device in the form of a beam spot on an input face of the wavelength conversion device;
    monitoring intensity of a frequency-converted optical signal output from the wavelength conversion device as the position of the optical unit is modified to move the beam spot to a plurality of different positions on the input face of the wavelength conversion device;
    identifying optimum coordinates x, y, z in the non-parallel directions of movement of the optical unit by referring to the monitored intensity;
    applying a native correction to the optimum coordinates x, y, z by monitoring intensity of a native frequency optical signal output from the wavelength conversion device as incremental adjustments are applied to the optimum coordinates x, y, z.

20. A method as claimed in claim 19 wherein the intensity of the frequency-converted optical signal and the native frequency optical signal are monitored by directing the signals along separate optical paths to different detectors.

* * * * *